United States Patent [19]
Young

[11] Patent Number: 5,514,319
[45] Date of Patent: May 7, 1996

[54] METHOD OF FABRICATING A RUBBER KEYPAD

[76] Inventor: Wen-Kuei Young, No. 4, Lane 275, Chung-Lin S. Rd.,, Hsin-Chuang City, Taipei Hsien, Taiwan

[21] Appl. No.: 280,667

[22] Filed: Jul. 27, 1994

[51] Int. Cl.$^6$ .............................. B29C 43/18; B29C 43/20
[52] U.S. Cl. ..................... 264/132; 261/135; 261/163; 261/259
[58] Field of Search ..................................... 264/132, 246, 264/259, 163, 261, 135

[56] References Cited

U.S. PATENT DOCUMENTS

| | | | |
|---|---|---|---|
| 2,169,825 | 8/1939 | Warren | 264/132 |
| 2,584,841 | 2/1952 | Caprez et al. | 264/246 |
| 3,651,191 | 3/1972 | Glatt et al. | 264/163 |
| 4,307,527 | 12/1981 | Suzuki | 264/259 |
| 4,464,326 | 8/1984 | Nishihira | 264/246 |
| 4,657,419 | 4/1987 | Takakuwa | 264/132 |
| 4,711,690 | 12/1987 | Haghiri-Tehrani | 264/132 |
| 5,098,633 | 3/1992 | Hausler | 264/132 |

FOREIGN PATENT DOCUMENTS 2-52788  2/1990  Japan .................................. 264/132

*Primary Examiner*—Robert Davis
*Attorney, Agent, or Firm*—Bacon & Thomas

[57] ABSTRACT

A fabrication method for an improved structure of a rubber keypad, particularly such a keypad used in a calculator, a telephone set, or another control module. The process first forms several protruding blocks arranged appropriately on a transparent, thin rubber plate. The protruding blocks are then marked with selected characters by painting, and the third rubber plate is then placed inside an upper and a lower mold for high-temperature, high-pressure pressing and punching. The mold is also provided with several rubber members to form a second rubber plate. The protruding blocks provided on the thin rubber plate are integrated with corresponding protruding blocks formed on the second rubber plate by the lower mold. Thus, the protruding blocks formed with characters and symbols, and the corresponding protruding blocks are combined, forming a keypad with layered character pads. Since the keypad structure has its characters printed between the layers, the discoloring of the keypads can be prevented. The keypad is suitable to be installed in a telephone set with its own light source, eliminating the need to paint the surface of the keypad with a dark color and simplifying the fabrication process.

3 Claims, 3 Drawing Sheets

METHOD OF FABRICATING A RUBBER KEYPAD

BACKGROUND OF THE INVENTION (a) Field of the Invention

The present invention relates to a fabrication method for an improved structure of a rubber keypad. More specifically, the present invention relates to the fabrication process for a rubber keypad with a printed character layer formed by a high-temperature, high pressure punching process on a transparent, thin rubber plate.

(b) Description of the Prior Art

A conventional keypad used in a telephone or a cellular phone has a diaphanous design because of the internal light source from the phone. These keypads are traditionally fabricated by punching on a piece of rubber, to form a thin rubber plate with a plurality of protruding blocks. The entire surface is then painted with a dark color. The protruding blocks, i.e., the individual keypads, then undergo a laser process which removes some of the dark paint, leaving markings of numbers and characters on the keypad (such as the '#' and '*' keys, the numbers and the letters). Since laser equipment is required in the above process, the manufacturing cost is high. In addition, repeated finger contacts on the keypad can deteriorate the painted markings on the keypad. Although a keypad for a calculator does not require the painting process, the characters on the keypad still come off after a period of time.

SUMMARY OF THE INVENTION

The main object according to the present invention is to provide a fabrication process for an improved structure of a rubber keypad. Protruding blocks provided on a transparent, thin rubber plate are first painted with characters in white color on a dark background (or hollow characters on a dark background). The thin rubber plate is then used in the high-temperature, high-pressure pressing and punching process. Protruding blocks provided on the thin rubber plate are separated from the thin rubber plate and are integrated with the corresponding protruding blocks provided on another rubber plate. Thus, the protruding blocks with characters and symbols and the corresponding protruding blocks are combined, forming a keypad with layered character pads to prevent the discoloring of the keypad through constant contacts. The manufacturing process is simplified, more economical and yields a keypad with a clear character set.

Another object according to the present invention is to provide a fabrication method for an improved structure in which the mounting of the keypad with layered character pads is flush with the inserted panel of a telephone set. Thus, the layered keypad isolates the light source inside the telephone set and serves as a shield for the external light. This simplifies the manufacturing process by eliminating the painting on the keypad surface with a dark color.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

The fabrication method an improved rubber keypad according to the present invention makes use of a transparent thin rubber plate 1, which is provided with a plurality of protruding blocks 11. Printing is performed on the protruding block 11 before the rubber plate 1 is integrated with a rubber member 4 through a high-temperature, high-pressure pressing and punching process. The process to yield a keypad is shown as follows.

Figure 1:
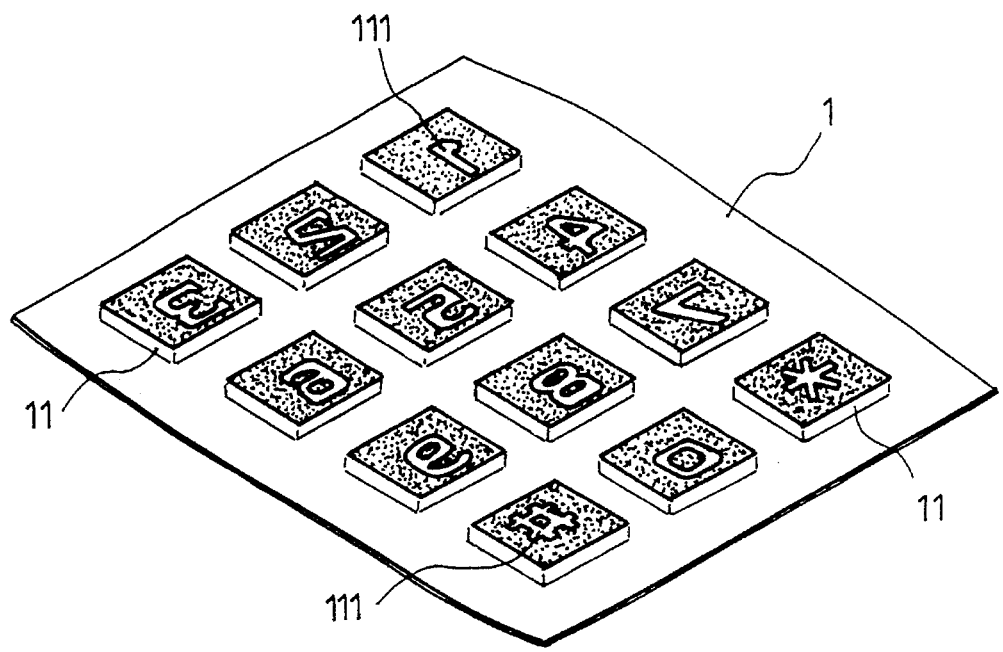
FIG. 1 is a perspective view of the transparent thin rubber plate for the fabrication of the rubber keypad according to the present invention.

(1) The thin transparent rubber plate 1, as shown in FIG. 1, is provided with several protruding blocks 11 which are arranged in an appropriate pattern based on the size and the location of the keypad. (For example, keypads used for cellular phones are provided with protruding blocks for 12 basic keys plus any other keys as required) The fabrication process of the thin rubber plate 1 and its protruding blocks is a conventional process and is not being discussed here. The protruding blocks 11 provided on the rubber thin plate 1 according to the present invention are printed with a set of selected numbers or characters. (Such as the '#' and the sign). The numbers or characters can be printed in a normal, fashion or they can be more reflective in white color on a dark background.

Figure 2:
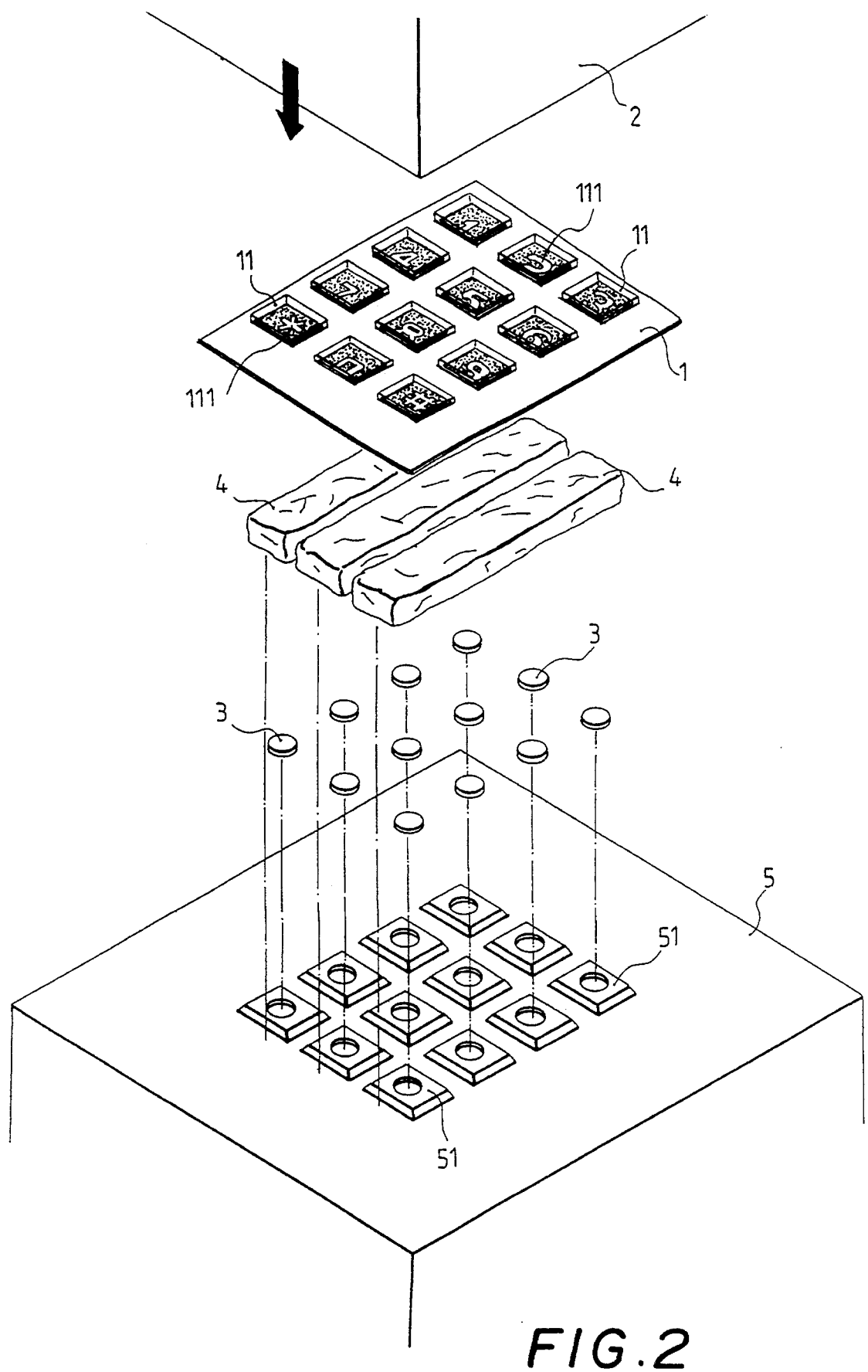
FIG. 2 is an exploded perspective view showing the formation of the rubber keypad through a high temperature pressing and punching process according to the present invention.
Figure 3:
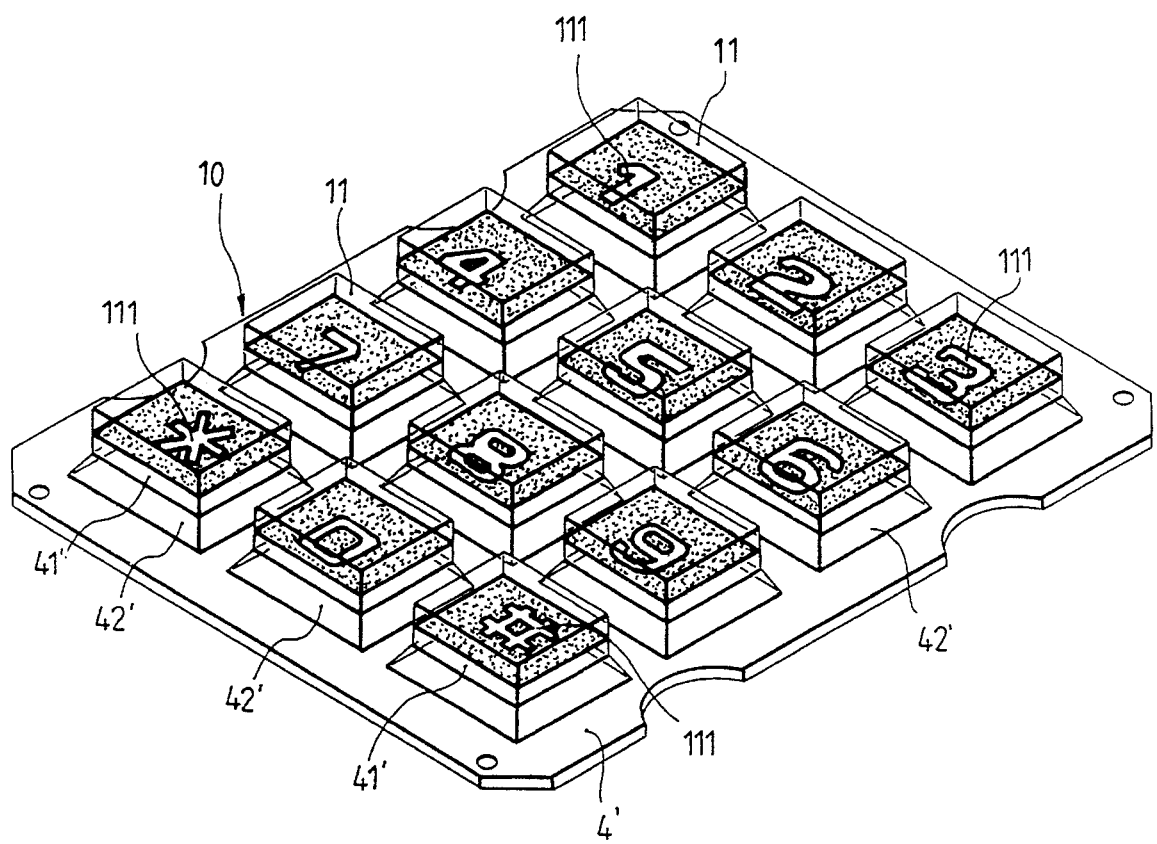
FIG. 3 is a perspective view of the keypad according to the present invention.

(2) The formation of the rubber keypad through a high-temperature, high-pressure pressing and punching process is shown in FIG. 2. The thin rubber plate (1) is first placed inside an upper mold 2 and a lower mold 5. The lower mold 5 is provided with several conductive rubber pads 3 (the conductive rubber pads 3 are designed based on the conduction characteristic requirements of the telephone set and any other hand held control module; it is noted the pads 3 are not required for a regular keyboard). The rubber conductive pads 3 are provided within mold portions 51 for each individual key. The mold is then provided with several rubber members 4. By the above configuration, the molds 2 and 5 cooperate with each other for the high-pressure pressing and punching process. The rubber member 4 is pressed into a rubber plate 4'. During the pressing and punching process, the above-mentioned protruding blocks 11 provided on the rubber thin plate 1 are integrated with the corresponding protruding blocks 41' formed on the rubber plate 4' by mold portions 51. The remaining portion of thin-rubber plate 1 is punched from the protruding blocks 11, as illustrated in FIG. 3. Thus the protruding blocks 11 with characters and symbols and the corresponding protruding blocks 41' are combined, forming a keypad 10 with layered character pads. Since the keypad structure has its characters printed between the layers, there is no direct finger contact with the character marks on the key, hence it is not necessary to worry about the discoloring of the characters.

Figure 4:
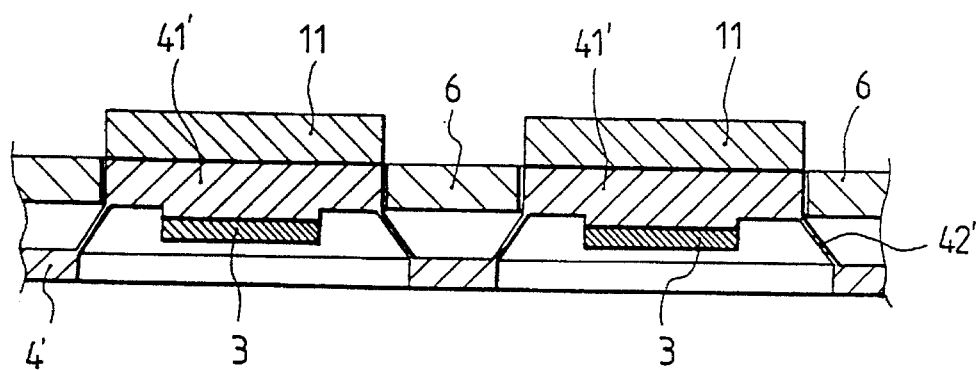
FIG. 4 shows a partial cross-sectional view of a dialing panel of a telephone set with the rubber keypad of the present invention installed.

(3) Not only is the overall fabrication of the keypad 10 simplified by the above process, but the keypad 10 can also cooperate with an inserted panel 6 (such as the dialing pad panel of a telephone set or the cellular phone), as is shown in FIG. 4. By such a configuration, the keypad 10 isolates the light source inside the telephone set and serves as a shield for external light. Therefore, the light source only emits from each individual reflected white keypad and it is not necessary to paint the surface of the keypad black, as is done in the conventional process. The process according to the present invention simplifies the fabrication and lowers the cost of manufacturing.

The rubber plate 4' as used in the fabrication of the keypad 10 is obtained by pressing the rubber members 4. The edges of the corresponding protruding blocks 41' are formed into appropriate cone-shaped surfaces 42' by mold portions 51. Since the rubber is flexible, the cone-shaped surfaces 42', when depressed, have a resiliency to return to their original position. However, this is a standard feature of the rubber keypad and is not further discussed here.

Upon the completion of the character painting (or hollow character) on the protruding blocks 11 of the transparent, thin rubber plate 1, the surface of the characters can further be painted with a layer of a different color, such as a layer of white for the number characters and a layer of red or green for the '#' and '*' symbols. However, the colored layer has to be diaphanous to allow the light to pass through.

It is understood that the forgoing description and accompanying illustrations are merely exemplary, and various changes and modifications to the preferred embodiments will be apparent to those skilled in the art. The scope of this invention is defined solely by the appended claims and their equivalents.

What is claimed is:

1. A fabrication method for an improved rubber keypad having a transparent thin rubber plate provided with a plurality of first protruding blocks comprising the steps of:

a) printing a set of selected numbers or characters, on the plurality of first protruding blocks;

b) placing the thin rubber plate between an upper mold and a lower mold having a plurality of raised mold portions corresponding to the first protruding blocks of the thin rubber plate;

c) placing a plurality of flexible rubber members between the thin rubber plate and the lower mold; and, d) pressing the two molds together under elevated temperature so as to form the plurality of flexible rubber members into a second rubber plate having second protruding blocks formed by the raised mold portions and punching the first protruding blocks from the thin rubber plate such that the first protruding blocks are integrated with the corresponding second protruding blocks provided on the second rubber plate with the characters between the first and second protruding blocks thereby forming a keypad with layered character keypads.

2. The fabrication method for an improved rubber keypad as recited in claim 1 comprising the additional step of attaching the layered character keypad to a panel of a telephone set, such that the layered character keypad isolates a light source inside a telephone set and serves as a shield for external light.

3. The fabrication method for an improved rubber keypad as recited in claim 1 comprising the additional step of painting the characters on the first protruding blocks with a layer of diaphanous color.

* * * * *